(12) United States Patent
Kanada et al.

(10) Patent No.: US 11,695,116 B2
(45) Date of Patent: Jul. 4, 2023

(54) METHOD FOR MANUFACTURING CATHODE ACTIVE MATERIAL FOR LITHIUM ION SECONDARY BATTERY

(71) Applicant: SUMITOMO METAL MINING CO., LTD., Tokyo (JP)

(72) Inventors: Satoshi Kanada, Niihama (JP); Tetsutaro Hayashi, Niihama (JP)

(73) Assignee: SUMITOMO METAL MINING CO., LTD., Tokyo (JP)

(*) Notice: Subject to any disclaimer, the term of this patent is extended or adjusted under 35 U.S.C. 154(b) by 333 days.

(21) Appl. No.: 17/264,963

(22) PCT Filed: Jul. 3, 2019

(86) PCT No.: PCT/JP2019/026508
§ 371 (c)(1),
(2) Date: Feb. 1, 2021

(87) PCT Pub. No.: WO2020/026687
PCT Pub. Date: Feb. 6, 2020

(65) Prior Publication Data
US 2022/0115655 A1 Apr. 14, 2022

(30) Foreign Application Priority Data
Aug. 2, 2018 (JP) .............................. JP2018-146245

(51) Int. Cl.
*H01M 4/525* (2010.01)
*C01G 53/00* (2006.01)
(Continued)

(52) U.S. Cl.
CPC ............ *H01M 4/525* (2013.01); *C01G 53/44* (2013.01); *H01M 4/0471* (2013.01);
(Continued)

(58) Field of Classification Search
CPC .................................................. H01M 4/0471
See application file for complete search history.

(56) References Cited

U.S. PATENT DOCUMENTS

2011/0117434 A1 5/2011 Ogasawara et al.
2015/0214545 A1 7/2015 Hasegawa et al.
(Continued)

FOREIGN PATENT DOCUMENTS

JP 2001-266879 A 9/2001
JP 2010-108899 A 5/2010
(Continued)

OTHER PUBLICATIONS

International Search Report w/English translation and Written Opinion in Japanese dated Aug. 13, 2019, issued in counterpart International Application No. PCT/JP2019/026508 (9 pages).

*Primary Examiner* — Peter F Godenschwager
(74) *Attorney, Agent, or Firm* — WHDA, LLP

(57) ABSTRACT

The cathode active material is capable of reducing cathode resistance of a secondary battery by enhancing electron conductivity thereof without reducing discharge capacity of the secondary battery. The method for manufacturing a cathode active material includes: mixing transition metal-containing composite compound particles containing lanthanum with a lithium compound to obtain a lithium mixture; calcinating the lithium mixture at a temperature equal to or lower than the melting point of the lithium compound; and then subjecting the lithium mixture to main firing at a firing temperature within a range of 725° C. to 1000° C. Lithium carbonate is preferably used as the lithium compound, and in this case, the calcination temperature is within a range of 600° C. to 723° C. It is preferable to obtain the transition metal-containing composite compound particles containing (Continued)

lanthanum by a coprecipitation method and to uniformly disperse a lanthanum element in the particles.

7 Claims, 5 Drawing Sheets

(51) Int. Cl.
    *H01M 4/04*         (2006.01)
    *H01M 4/36*         (2006.01)
    *H01M 4/505*       (2010.01)
    *H01M 4/02*         (2006.01)

(52) U.S. Cl.
    CPC ........... *H01M 4/366* (2013.01); *H01M 4/505* (2013.01); *C01P 2002/50* (2013.01); *C01P 2004/01* (2013.01); *C01P 2004/84* (2013.01); *C01P 2006/40* (2013.01); *H01M 2004/028* (2013.01)

(56) References Cited

U.S. PATENT DOCUMENTS

2016/0006029 A1    1/2016    Sugaya et al.
2017/0012289 A1    1/2017    Kawakita et al.

FOREIGN PATENT DOCUMENTS

WO    2014/049931 A1    4/2014
WO    2014/156054 A1    10/2014
WO    2015/125444 A1    8/2015

METHOD FOR MANUFACTURING CATHODE ACTIVE MATERIAL FOR LITHIUM ION SECONDARY BATTERY

TECHNICAL FIELD

The present invention relates to a method for manufacturing a cathode active material for a lithium ion secondary battery.

BACKGROUND ART

In recent years, with spread of a portable electronic device such as a mobile phone or a notebook personal computer, there is a strong demand for development of a small and lightweight secondary battery having a high energy density. In addition, there is a strong demand for development of a secondary battery having excellent output characteristics and charge and discharge cycle characteristics as a battery for an electric car such as a hybrid car.

As a secondary battery satisfying such a requirement, there is a lithium ion secondary battery. This lithium ion secondary battery includes an anode, a cathode, an electrolyte, and the like, and as an active material of the anode and the cathode, a material capable of desorbing and inserting lithium is used. Note that as the electrolyte, a non-aqueous electrolyte such as a non-aqueous electrolyte solution obtained by dissolving a lithium salt as a supporting salt in an organic solvent, or a nonflammable solid electrolyte having ionic conductivity is used.

Such a lithium ion secondary battery is currently being actively studied and developed. In particular, a lithium ion secondary battery using a lithium transition metal-containing composite oxide having a layered rock salt type or spinel type crystal structure as a cathode active material has been put into practical use as a battery having a high energy density because a high voltage at a level of 4 V can be obtained.

Examples of a lithium transition metal-containing composite oxide that has been mainly proposed so far include a lithium cobalt composite oxide ($LiCoO_2$) relatively easily synthesized, a lithium nickel composite oxide ($LiNiO_2$) using nickel cheaper than cobalt, a lithium nickel cobalt manganese composite oxide ($LiNi_{1/3}CO_{1/3}Mn_{1/3}O_2$), and a lithium manganese composite oxide ($LiMn_2O_4$) using manganese.

In order to improve the characteristics of a battery using a cathode active material including such a lithium transition metal-containing composite oxide, it has been proposed to cover particles configuring the lithium transition metal-containing composite oxide with a conductive oxide exhibiting high electron conductivity.

For example, JP 2001-266879 A discloses a non-aqueous electrolyte secondary battery characterized in that surfaces of particles configuring a cathode active material is covered with a conductive oxide selected from the group consisting of (a) an oxide represented by $ABO_3$ and having a perovskite structure, (b) an oxide represented by $A_2BO_4$ and having a $K_2NiF_4$ type structure, and (c) a mixture thereof (in which A represents at least one selected from the group consisting of a divalent typical element, a lanthanoid element, and a combination thereof, and B represents at least one selected from transition elements belonging to Group IVa, Group Va, Group VIa, Group VIIa, Group VIII, and Group Ib) and having free electrons. With such a configuration, it is said that both high energy density and excellent safety can be achieved in a non-aqueous electrolyte secondary battery.

CITATION LIST

Patent Literature

Patent Literature 1: JP 2001-266879 A

SUMMARY OF INVENTION

Technical Problem

However, in the lithium ion secondary battery disclosed in JP 2001-266879 A, surfaces of particles configuring the cathode active material are only covered with the conductive oxide, and there is no conductive oxide in gaps or grain boundaries inside the particles configuring the cathode active material. In addition, the conductive oxides specifically proposed in JP 2001-266879 A are all substances not exhibiting lithium ion conductivity. When the entire surface of the cathode active material is covered with such a substance not exhibiting lithium ion conductivity, transmission of lithium ions is difficult. As a result, the battery capacity of the non-aqueous electrolyte solution secondary battery decreases disadvantageously.

Solution to Problem

In order to solve the above problems, the method for manufacturing a cathode active material for a lithium ion secondary battery of the present invention is characterized by including: a mixing process of mixing transition metal-containing composite compound particles containing lanthanum with a lithium compound to obtain a lithium mixture; a calcination process of firing the lithium mixture at a temperature equal to or lower than the melting point of the lithium compound; and a main firing process of firing the lithium mixture at a temperature higher than the melting point of the lithium compound after the calcination process.

This brings about a cathode active material for a lithium ion secondary battery, the cathode active material including a lithium transition metal-containing oxide configured by secondary particles each formed of a plurality of primary particles, in which lanthanum compound particles each having a perovskite-type structure are dispersed on surfaces of the secondary particles and/or in gaps or grain boundaries between the primary particles, and the lanthanum compound particles have a cross-sectional average particle size of 0.70 µm or less.

Lithium carbonate is preferably used as the lithium compound.

When lithium carbonate is used as the lithium compound, the firing temperature in the calcination process is preferably within a range of 600° C. to 723° C.

The firing temperature in the main firing process is preferably within a range of 725° C. to 1000° C.

It is preferable to obtain the transition metal-containing composite compound particles containing lanthanum by a coprecipitation method.

The content of lanthanum in the transition metal-containing composite compound particles containing lanthanum is preferably an amount corresponding to a range of 0.1% by mass to 5% by mass with respect to the entire cathode active material for a lithium ion secondary battery.

A coprecipitation process for obtaining the transition metal-containing composite compound particles containing lanthanum by the coprecipitation method preferably includes:

a nuclear generation process of performing nuclear generation by controlling an aqueous solution for nuclear generation containing a first transition element compound containing at least one first transition element selected from the group consisting of nickel, manganese, and cobalt and an ammonium ion supplier such that a pH value on the basis of the liquid temperature of 25° C. is 12.0 to 14.0; and a particle growth process of growing the nuclei by controlling an aqueous solution for particle growth containing nuclei obtained in the nuclear generation process such that a pH value is lower than the pH value on the basis of the liquid temperature of 25° C. in the nuclear generation process and is 10.5 to 12.0, and supplying the first transition element compound and a lanthanum-containing compound.

Advantageous Effects of Invention

According to the present invention, it is possible to manufacture a cathode active material for a lithium ion secondary battery capable of improving electron conductivity thereof while maintaining lithium ion conductivity by an industrial manufacturing means. Therefore, it is possible to reduce cathode resistance of the lithium ion secondary battery without lowering discharge capacity thereof.

DESCRIPTION OF EMBODIMENTS

Figure 1:
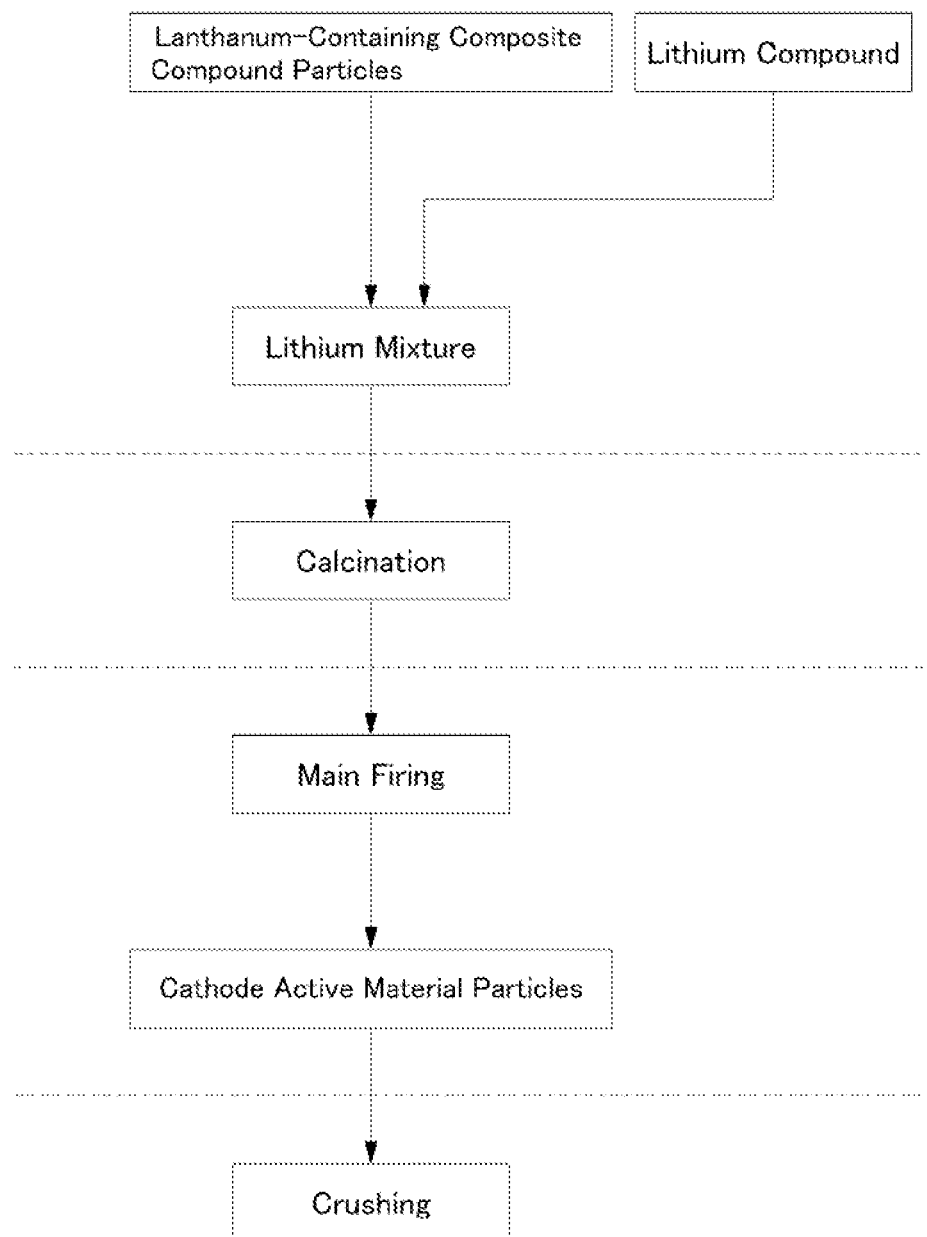
FIG. 1 is a flow chart of a method for manufacturing a cathode active material of the present invention.

1. Cathode Active Material for Lithium Ion Secondary Battery (1) Lithium Transition Metal-Containing Composite Oxide The lithium transition metal-containing composite oxide configuring the cathode active material for a lithium ion secondary battery of the present invention (hereinafter referred to as "cathode active material") is configured by secondary particles each formed by aggregation of a plurality of primary particles. The secondary particle may have any shape, and for example, can adopt a structure such as a solid structure in which the entire secondary particle is formed of an aggregate of a plurality of primary particles, a hollow structure in which a space is present inside the secondary particle, or a porous structure in which a large number of voids are present inside the secondary particle.

The size of the secondary particle is not particularly limited, but the volume-based average particle size thereof is preferably within a range of 1 µm to 30 µm, and more preferably within a range of 3 µm to 10 µm. The volume-based average particle size can be determined from, for example, a volume integration value measured with a laser light diffraction/scattering type particle size analyzer.

The type of lithium transition metal-containing composite oxide (hereinafter referred to as "composite oxide") is not particularly limited, and the present invention can be applied to any composite oxide such as $LiCoO_2$, $LiNiO_2$, $LiNi_{1/3}CO_{1/3}Mn_{1/3}O_2$, $LiMnO_2$, or $LiMn_2O_4$. However, in particular, the present invention can be preferably applied to a composite oxide represented by a general formula: $Li_{1+u}Ni_xCo_yMn_zM_tO_2$ (in which $-0.10 \leq u \leq 0.10$, $x+y+z+t=1$, $0 \leq x \leq 1$, $0 \leq y \leq 1$, $0 \leq z \leq 1$, $0 \leq t \leq 0.15$, M is at least one additive element selected from the group consisting of Mg, Ca, Al, Ti, V, Cr, Zr, Nb, Mo, and W).

Nickel (Ni) is an element that contributes to potential increase and capacity enlargement of a secondary battery. When Ni is contained, the value of x indicating the content of Ni is 0.2 or more and 1 or less, preferably 0.3 or more and 0.9 or less, and more preferably 0.3 or more and 0.6 or less. When the value of x is less than 0.2, an effect of improving the battery capacity of a secondary battery obtained by inclusion of Ni cannot be sufficiently obtained.

Cobalt (Co) is an element that contributes to improvement of charge and discharge cycle characteristics. When Co is contained, the value of y indicating the content of Co is 0.2 or more and 1 or less, preferably 0.3 or more and 0.9 or less, and more preferably 0.3 or more and 0.6 or less. When the value of y is less than 0.2, an effect of improving charge and discharge cycle characteristics obtained by inclusion of Co cannot be sufficiently obtained.

Manganese (Mn) is an element that contributes to improvement of thermal stability. When Mn is contained, the value of z indicating the content of Mn is 0.2 or more and 1 or less, preferably 0.3 or more and 0.9 or less, and more preferably 0.3 or more and 0.6 or less. When the value of z is less than 0.2, an effect of improving thermal stability obtained by inclusion of Mn cannot be sufficiently obtained.

The value of t indicating the content of the additive element M is 0 or more and 0.15 or less, preferably 0 or more and 0.1 or less, and more preferably 0 or more and 0.05 or less. When the value of t exceeds 0.15, a metal element that contributes to a Redox reaction decreases, and therefore battery capacity decreases.

The value of x indicating the content of Ni, the value of y indicating the content of Co, the value of z indicating the content of Mn, and the value of t indicating the content of the additive element M described above are appropriately selected according to an application of the secondary battery and required performance.

(2) Lanthanum Compound Particle Having Perovskite-Type Structure

The present invention is characterized by containing lanthanum compound particles each having a perovskite-type structure. The perovskite-type structure is a compound represented by a general formula: $ABO_3$. Usually, A represents at least one selected from the group consisting of a divalent typical element, a lanthanoid element, and a combination thereof, and B represents at least one selected from transition elements belonging to Group IVa, Group Va, Group VIa, Group VIIa, Group VIII, and Group Ib.

However, in the present invention, at least a part of the A site contains La. In addition, the B site preferably contains at least one element selected from the group consisting of Ni, Co, and Mn because electron conductivity is improved. The lanthanum compound having a perovskite-type structure with such a structure has high electron conductivity.

Examples of the lanthanum compound having a perovskite-type structure applicable to the present invention include $LaNiO_3$, $La(Ni_{1-x}Co_x)O_3$, $La(Ni_{1-x-y}Co_xMn_y)O_3$, $(La_{1-x}Ca_x)MnO_3$, $(La_{1-x}Sr_x)MnO_3$, $(La_{1-x}Ba_x)MnO_3$, $(La_{1-x}Ca_x)CoO_3$, $(La_{1-x}Sr_x)CoO_3$, and $(La_{1-z}Ba_x)CoO_3$.

Cations at the A site and B site may be defective or excessive. Oxygen atoms can also be deficient or excessive.

(3) Location of Lanthanum Compound Particle

The lanthanum compound particles are present on surfaces of the secondary particles configuring the composite oxide and/or in gaps or grain boundaries between the primary particles. By the presence of the lanthanum compound particles having high electron conductivity on surfaces of the secondary particles, an effect of reducing resistance due to movement of electrons between the electrolyte and the secondary particles is expected. In addition, by the presence of the lanthanum compound particles in gaps or grain boundaries between the primary particles, reduction of resistance due to movement of electrons between the primary particles configuring the composite oxide is expected.

However, the lanthanum compound itself has low lithium ion conductivity, and it is difficult for lithium ions to pass through the lanthanum compound. Therefore, when the lanthanum compound particles are present so as to cover surfaces of the secondary particles configuring the composite oxide in a film shape, movement of lithium ions between the surface of the composite oxide and the electrolyte solution is hindered. In addition, even when the lanthanum compound particles are present as a lump in gaps or grain boundaries between the primary particles, an effect of reducing resistance due to the movement of electrons between the primary particles cannot be sufficiently obtained.

Therefore, the lanthanum compound particles of the present invention do not cover the entire surface of each of the secondary particles of the composite oxide, or are not present as a lump in gaps or grain boundaries between the primary particles, but as will be described later, are dispersed on surfaces of the secondary particles and/or in gaps or grain boundaries between the primary particles.

(4) Size of Lanthanum Compound Particle

Regarding the size of the lanthanum compound particle, an average particle size of the lanthanum compound particles in a cross sectional image of the cathode active material (hereinafter referred to as "cross-sectional average particle size"), and additionally an average particle size of the lanthanum compound particles in a surface image of the cathode active material (hereinafter referred to as "surface average particle size") can be used as an index thereof. In the present invention, the cross-sectional average particle size of the lanthanum compound particles is 0.70 μm or less, preferably within a range of 0.25 μm to 0.70 μm, more preferably within a range of 0.30 μm to 0.60 μm, and still more preferably within a range of 0.30 μm to 0.50 μm. When the cross-sectional average particle size of the lanthanum compound particles is larger than 0.70 μm, an effect of improving electron conductivity of the cathode active material is small as compared to the amount of lanthanum added, and therefore a sufficient effect of reducing cathode resistance cannot be obtained. Meanwhile, although there is no problem in reducing the cross-sectional average particle size of the lanthanum compound particles to less than 0.25 μm, it is necessary to increase a crystallite diameter of the cathode active material, which is a base material, to a desired range, and therefore a lower limit of the cross-sectional average particle size of the lanthanum compound particles is about 0.30 μm under conditions of firing the lanthanum compound particles.

Here, the cross-sectional average particle size refers to a value obtained by analyzing the shapes of the lanthanum compound particles using image analysis software or the like from a cross sectional image of the cathode active material obtained by a scanning electron microscope (SEM), a transmission electron microscope (TEM), or the like, calculating a maximum ferret diameter of each of the lanthanum compound particles (a distance of the longest straight line connecting any two points on an outer boundary of each of the lanthanum compound particles), and calculating a number average thereof.

Note that in the cathode active material of the present invention, the surface average particle size of the lanthanum compound fine particles is also preferably adjusted within a predetermined range. In the present invention, the surface average particle size of the lanthanum compound particles is 0.50 μm or less, preferably within a range of 0.10 μm to 0.50 μm, more preferably within a range of 0.10 μm to 0.46 μm, and still more preferably within a range of 0.15 μm to 0.40 μm. When the surface average particle size of the lanthanum compound particles is larger than 0.50 μm, an effect of improving electron conductivity of the cathode active material is small as compared to the amount of lanthanum added, and therefore a sufficient effect of reducing cathode resistance cannot be obtained. Meanwhile, although there is no problem in reducing the surface average particle size of the lanthanum compound particles to less than 0.50 μm, a lower limit of the surface average particle size of the lanthanum compound particles is about 0.10 μm for a similar reason to the cross-sectional average particle size.

Here, the surface average particle size is a value obtained by calculating a maximum ferret diameter of each of the lanthanum compound particles from a backscattered electron image of a surface of the cathode active material obtained by a scanning electron microscope (SEM), a transmission electron microscope (TEM), or the like, and calculating a number average thereof.

(5) Dispersibility of Lanthanum Compound Particles

In the present invention, the lanthanum compound particles are dispersed on surfaces of the secondary particles configuring the composite oxide and/or in gaps or grain boundaries between the primary particles. Dispersibility of the lanthanum compound particles can be evaluated, for example, by measuring the number of lanthanum compounds present per unit area of surfaces of the secondary particles of the composite oxide from a surface image of the cathode active material obtained by SEM or the like, or by measuring the number of lanthanum compound particles present per unit area of cross sections of the secondary particles from a cross sectional image of the cathode active material obtained by SEM, TEM, or the like.

Specifically, in the present invention, (A) the number of lanthanum compound particles present per unit area of surfaces of the secondary particles of the composite oxide is 0.01 particles/μm² to 0.25 particles/μm², preferably 0.02 particles/μm² to 0.22 particles/μm², and more preferably 0.10 particles/μm² to 0.20 particles/μm².

The number of lanthanum compound particles present per unit area of surfaces of the secondary particles is a value obtained by measuring the number of lanthanum compound particles present on surfaces of the secondary particles and the area of the secondary particles from a surface image of the cathode active material obtained by SEM or the like, and dividing the number of lanthanum compounds by the area of the secondary particles.

Note that the dispersibility of the lanthanum compound particles on surfaces of the secondary particles of the composite oxide can also be evaluated by the number of lanthanum compound particles present on a surface of one of the secondary particles. In this case, the number of lanthanum compound particles present on a surface of one of the secondary particles is 0.20 particles to 2.50 particles, preferably 0.50 particles to 2.30 particles, and more preferably 1.00 particles to 2.30 particles.

The number of lanthanum compound particles present on a surface of one of the secondary particles is a value obtained by measuring the number of lanthanum compounds present on a surface of each of the secondary particles from a surface image of the cathode active material obtained by SEM or the like, and calculating a number average thereof.

Meanwhile, (B) the number of lanthanum compound particles present per unit area of cross sections of the secondary particles of is 0.03 particles/$\mu m^2$ to 0.10 particles/$\mu m^2$, preferably 0.04 particles/$\mu m^2$ to 0.10 particles/$\mu m^2$, and more preferably 0.05 particles/$\mu m^2$ to 0.095 particles/$\mu m^2$.

The number of lanthanum compound particles present per unit area of cross sections of the secondary particles is a value obtained by measuring the number of lanthanum compounds present on cross sections of the secondary particles and the cross sectional area of the secondary particles from a cross sectional image of the cathode active material obtained by SEM, TEM, or the like, and dividing the number of lanthanum compounds by the cross sectional area of the secondary particles.

When either (A) the number of lanthanum compound particles present per unit area of surfaces of the secondary particles or (B) the number of lanthanum compound particles present per unit area of cross sections of the secondary particles meets the above requirements, it can be said that this is within the scope of the present invention, but both (A) and (B) preferably meet the above requirements.

(6) Content of Lanthanum

The content of lanthanum with respect to the entire cathode active material is preferably within a range of 0.1% by mass to 5% by mass, more preferably within a range of 0.3% by mass to 2% by mass, and still more preferably within a range of 0.3% by mass to 0.7% by mass. When the content of lanthanum is larger than 5% by mass, the amount of perovskite-type lanthanum compound particles that do not function as an active material for lithium ions increases, and the discharge capacity of the secondary battery decreases. Meanwhile, when the content of lanthanum is smaller than 0.1% by mass, an effect of improving electron conductivity due to inclusion of the lanthanum compound particles cannot be sufficiently obtained. Note that the content of lanthanum can be determined, for example, by analysis using an ICP emission spectroscopic analyzer.

2. Method for Manufacturing Cathode Active Material

FIG. 1 illustrates a flow chart of a method for manufacturing a cathode active material of the present invention. The method for manufacturing a cathode active material of the present invention will be described in detail below with reference to FIG. 1.

(1) Transition Metal-Containing Composite Compound Particles Containing Lanthanum The transition metal-containing composite compound particles containing lanthanum (hereinafter referred to as "lanthanum-containing composite compound particles") as a precursor of the cathode active material may be in any form such as a hydroxide, an oxide, a nitrate, or a carbonate as long as containing at least lanthanum and a transition metal. In the lanthanum-containing composite compound particles, lanthanum is preferably uniformly distributed in the transition metal-containing composite compound particles. It is considered that the uniform distribution of lanthanum in the transition metal-containing composite compound particles improves the dispersibility of the lanthanum compound particles in a cathode active material obtained after a firing process (main firing process).

Note that the dispersibility of lanthanum in the lanthanum-containing composite compound particles can be confirmed by energy dispersive X-ray analysis using a scanning electron microscope (SEM-EDS).

The lanthanum-containing composite compound particles can be obtained by a known means such as a coprecipitation method using crystallization.

Figure 2:
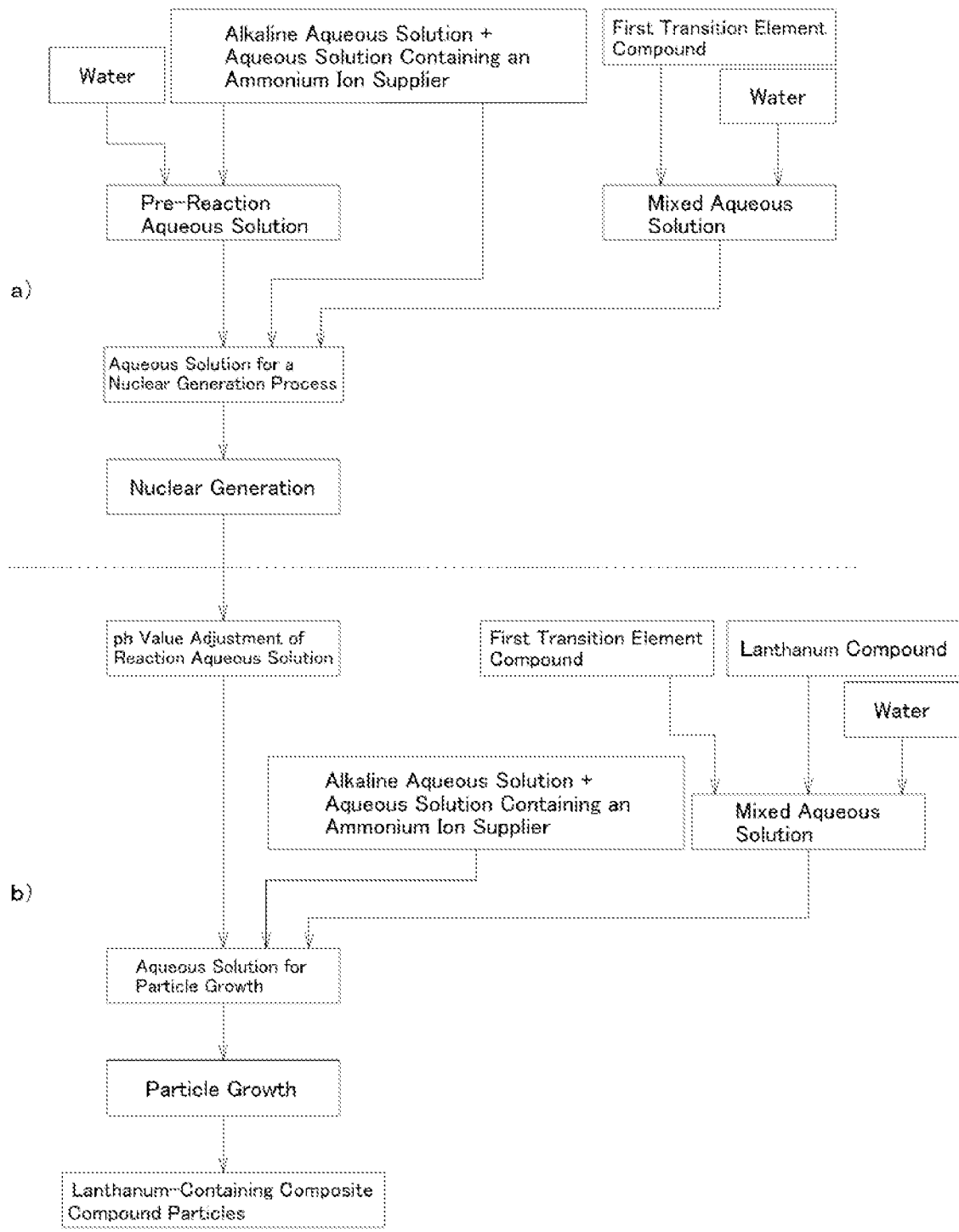
FIG. 2 is a flow chart of a method for manufacturing lanthanum-containing composite compound particles by a coprecipitation method.

The coprecipitation method for obtaining lanthanum-containing composite compound particles preferably includes a nuclear generation process of mainly performing nuclear generation and a particle growth process of mainly performing particle growth. FIG. 2 illustrates a flow chart of a method for manufacturing lanthanum-containing composite compound particles by a coprecipitation method. The method for manufacturing lanthanum-containing composite compound particles by the coprecipitation method will be described in detail below with reference to FIG. 2.

a) Nuclear Generation Process

First, a first transition element compound containing at least one first transition element (3d transition element) selected from the group consisting of nickel, manganese, and cobalt is dissolved in water at a predetermined ratio to prepare a raw material aqueous solution. At the same time, an alkaline aqueous solution and an aqueous solution containing an ammonium ion supplier are supplied into a reaction tank and mixed to prepare a pre-reaction aqueous solution having a pH value measured on the basis of the liquid temperature of 25° C. within a range of 12.0 to 14.0 and an ammonium ion concentration within a range of 3 g/L to 25 g/L. Note that the pH value of the pre-reaction aqueous solution can be measured with a pH meter, and the ammonium ion concentration can be measured with an ion meter.

Next, the raw material aqueous solution is supplied while the pre-reaction aqueous solution is stirred. As a result, an aqueous solution for nuclear generation, which is a reaction aqueous solution in the nuclear generation process, is formed in the reaction tank. Since the pH value of this aqueous solution for nuclear generation is within the above range, in the nuclear generation process, a nucleus hardly grows and nuclear generation occurs preferentially. Note that in the nuclear generation process, the pH value of the aqueous solution for nuclear generation and the concentration of ammonium ions change with nuclear generation. Therefore, it is necessary to supply an alkaline aqueous solution and an ammonia aqueous solution at an appropriate time to perform control such that the pH value on the basis of the liquid temperature of 25° C. of the solution in the reaction tank is maintained within a range of pH 12.0 to 14.0 and the concentration of ammonium ions thereof is maintained within a range of 3 g/L to 25 g/L.

b) Particle Growth Process

After the nuclear generation process is completed, the pH value on the basis of the liquid temperature of 25° C. of the aqueous solution for nuclear generation in the reaction tank is adjusted so as to be within a range of 10.5 to 12.0, and the first transition element compound and a lanthanum-containing compound are supplied at a predetermined ratio to form an aqueous solution for particle growth, which is a reaction aqueous solution in the particle growth process. Note that the pH value can also be adjusted by stopping supply of the alkaline aqueous solution. However, in order to obtain composite hydroxide particles having a narrow particle size distribution, it is preferable to temporarily stop supply of all the aqueous solutions and to adjust the pH value. Specifically, it is preferable to adjust the pH value by stopping supply of all the aqueous solutions and then supplying an inorganic acid of the same type as an acid constituting a metal compound as a raw material to the aqueous solution for nuclear generation.

At the same time, the first transition element compound containing at least one first transition element selected from the group consisting of nickel, manganese, and cobalt and the lanthanum-containing compound are dissolved in water at a predetermined ratio to adjust a raw material aqueous solution for particle growth.

Next, the raw material aqueous solution for particle growth is supplied while the aqueous solution for particle growth is stirred. At this time, since the pH value of the aqueous solution for particle growth is within the above range, a new nucleus is hardly generated, nucleus (particle) grow proceeds, and composite hydroxide particles having predetermined particle sizes are formed. Note that also in the particle growth process, the pH value and the ammonium ion concentration of the aqueous solution for particle growth change with particle growth. Therefore, it is necessary to supply the alkaline aqueous solution and the ammonia aqueous solution at an appropriate time to maintain the pH value and the ammonium ion concentration within the above ranges.

Note that a reaction atmosphere in the nuclear generation process and the particle growth process is appropriately adjusted according to a required structure of the secondary particle. For example, when lanthanum-containing composite compound particles obtained by setting the reaction atmosphere to a non-oxidizing atmosphere having an oxygen concentration of 5% by volume or less throughout the nuclear generation process and the particle growth process are fired, a lithium-transition metal composite oxide having a solid structure is obtained.

Meanwhile, when the reaction atmosphere in the nuclear generation process and at an initial stage of the particle growth process is an oxidizing atmosphere in which an oxygen concentration exceeds 5% by volume, and the reaction atmosphere is switched from the oxidizing atmosphere to a non-oxidizing atmosphere in the particle growth process, an obtained lanthanum-containing composite compound particle includes a low-density center formed of fine primary particles and a high-density outer shell section formed of plate-shaped primary particles larger than the fine primary particles. When such lanthanum-containing composite compound particles are fired, a lithium-transition metal composite oxide having a hollow structure is obtained.

In addition, by performing reaction atmosphere control of setting the reaction atmosphere in the nuclear generation process to a non-oxidizing atmosphere, switching the reaction atmosphere to an oxidizing atmosphere in the particle growth process, and then switching the reaction atmosphere to the non-oxidizing atmosphere again once or more times, lanthanum-containing composite compound particles each having a laminated structure in which low density layers and high density layers are alternately laminated are obtained. When such lanthanum-containing composite compound particles are fired, a lithium-transition metal composite oxide having a porous structure in which a plurality of voids is dispersed inside the particles is obtained.

Note that it does not matter whether or not the first transition element compound in the nuclear generation process and the particle growth process contains lanthanum. However, when the first transition element compound contains lanthanum, the amount of the lanthanum-containing compound added is adjusted such that the content of lanthanum is within the range specified in the present invention.

(2) Lithium Compound

The type of lithium compound is not particularly limited, but lithium carbonate (melting point: 723° C.), lithium hydroxide (melting point: 462° C.), lithium nitrate (melting point: 261° C.), and the like can be preferably used. Among these compounds, lithium carbonate or lithium hydroxide is preferably used in consideration of ease of handling and stability of quality.

(3) Mechanism of Generating Lanthanum Compound Particles

It is considered that the lanthanum compound particles are generated by a flux effect of the lithium compound in the firing process including a calcination process and a main firing process, and the lanthanum element uniformly dispersed in the transition metal-containing composite compound particles is grain-grown in a particulate shape. Therefore, an effect of grain growth of the lanthanum compound particles is remarkable at a temperature higher than the melting point of the lithium compound to be mixed. In addition, it is considered that the effect of grain growth increases as the amount of the lithium compound present at a temperature higher than the melting point of the lithium compound increases.

Meanwhile, a generation reaction of the lithium transition metal-containing composite oxide (hereinafter referred to as "lithium composite oxide") configuring the cathode active material is caused by a solid phase reaction even at a temperature equal to or lower than the melting point of the lithium compound.

Therefore, by performing firing at a temperature at which lanthanum compound particles are unlikely to be generated, specifically, at a temperature equal to or lower than the melting point of the lithium compound in the calcination process, the lithium compound is consumed in a state where generation and grain growth of the lanthanum compound particles are suppressed, and a generation reaction of the lithium composite oxide proceeds. As a result, even when firing is performed at a temperature higher than the melting point of the lithium compound in the main firing process, the amount of residual lithium compound is reduced. Therefore, in a cathode active material obtained after the main firing process, the particle sizes of the lanthanum compound particles can be reduced, and the lanthanum compound particles can be dispersed.

(4) Mixing Process

A mixing process is a process of mixing the lithium compound with the lanthanum-containing composite compound particles to obtain a lithium mixture. In the mixing process, lanthanum-containing composite compound particles are mixed with a lithium compound such that a ratio of the number of atoms of lithium (Li) to the sum of the number of atoms (Me) of lithium atoms and metal atoms other than lithium in the lithium mixture, specifically, transition metals such as nickel, cobalt, and manganese excluding lanthanum and other additive elements (Li/Me) is 0.95 to 1.5, preferably 1.0 to 1.5, more preferably 1.0 to 1.35, and still more preferably 1.0 to 1.2. That is, since Li/Me does not change after the firing process as compared with Li/Me before the firing process, it is necessary to mix the lanthanum-containing composite compound particles with the lithium compound such that Li/Me in the mixing process is Li/Me of a target cathode active material (lithium composite oxide).

Preferably, the lanthanum-containing composite compound particles are sufficiently mixed with the lithium compound so as not to generate fine powder. Insufficient mixing may result in variations in Li/Me between individual particles, and may make it impossible to obtain sufficient battery characteristics. Note that a general mixer can be used for mixing. For example, a shaker mixer, a Lodige mixer, a Julia mixer, or a V blender can be used.

(5) Calcination Process

In the present invention, the process of firing the lithium compound includes a calcination process and a main firing process. Of these processes, in the calcination process, a reaction between the transition metal-containing composite compound particles and the lithium compound by a solid phase reaction proceeds while suppressing generation of lanthanum compound particles. Therefore, firing is preferably performed at a temperature equal to or lower than the melting point of the lithium compound to be mixed. Therefore, the firing temperature in the calcination process is appropriately determined according to the type of lithium compound applied. For example, when lithium carbonate (melting point: 723° C.) is used, the firing temperature is preferably 600° C. to 723° C., and more preferably 630° C. to 720° C. When lithium hydroxide (melting point: 462° C.) is used, the firing temperature is preferably 300° C. to 462° C., and more preferably 400° C. to 460° C. Furthermore, when lithium nitrate (melting point: 251° C.) is used, the firing temperature is preferably within a range of 200° C. to 251° C., and more preferably 220° C. to 250° C.

The holding time at the firing temperature of the calcination process is preferably within a range of 0.5 hours to 10 hours, and preferably within a range of 2 hours to 4 hours. The atmosphere in the calcination process is preferably an oxidizing atmosphere, and more preferably an atmosphere having an oxygen concentration within a range of 18% by volume to 100% by volume as in the main firing process described later.

The furnace used in the firing process including the calcination process is not particularly limited as long as the furnace can perform heating in the air or an oxygen flow. However, an electric furnace that does not generate gas is preferable from a viewpoint of keeping the atmosphere in the furnace uniform, and either a batch type electric furnace or a continuous type electric furnace can be preferably used.

Note that between the calcination process and the main firing process, it is not always necessary to lower the temperature to room temperature, and the temperature may be raised from the firing temperature in the calcination process such that the process enters the main firing process.

(6) Main Firing Process

The main firing process is a process of firing the cathode active material formed in the calcination process at a temperature higher than the melting point of the lithium compound to increase the crystallinity of the cathode active material.

The furnace used in the main firing process is not particularly limited as long as the furnace can perform heating in the air or an oxygen flow. Similarly, a batch type electric furnace or a continuous type electric furnace that does not generate gas is preferably used from a viewpoint of keeping the atmosphere in the furnace uniform. The furnace used in the calcination process can also be used continuously.

The firing temperature in the main firing process is preferably a temperature higher than the melting point of the lithium compound from viewpoints of enhancing the crystallinity of the cathode active material and promoting generation of lanthanum compound particles due to a flux effect of the lithium compound.

For example, when lithium carbonate (melting point: 723° C.) is used, the firing temperature is preferably within a range of 725° C. to 1000° C., and more preferably within a range of 800° C. to 1000° C. When lithium hydroxide (melting point: 462° C.) or lithium nitrate (melting point: 251° C.) is used, similarly, the firing temperature is preferably within a range of 725° C. to 1000° C., and more preferably within a range of 800° C. to 1000° C.

When the firing temperature in the main firing process is lower than 725° C., the crystallinity of obtained lithium transition metal-containing composite oxide particles may be insufficient. Meanwhile, when the firing temperature is higher than 1000° C., sintering between the lithium composite oxide particles severely occurs, abnormal grain growth is caused, and the ratio of amorphous coarse particles increases.

The holding time at the firing temperature in the main firing process is preferably 1 hour to 10 hours, and preferably 2 hours to 6 hours. When the holding time at the firing temperature in the main firing process is less than 1 hour, the crystallinity of obtained lithium composite oxide may be insufficient.

The atmosphere when firing is preferably an oxidizing atmosphere, more preferably an atmosphere having an oxygen concentration of 18% by volume to 100% by volume, and particularly preferably a mixed atmosphere of oxygen and an inert gas having the above oxygen concentration. That is, firing is preferably performed in the air or an oxygen flow. When the oxygen concentration is less than 18% by volume, the crystallinity of the lithium composite oxide may be insufficient.

(7) Crushing Process

The secondary particles constituting the cathode active material formed of the lithium composite oxide containing the lanthanum compound particles, obtained in the main firing process (hereinafter referred to as "cathode active material particles") may be aggregated or slightly sintered. In such a case, the aggregate or sintered body of the cathode active material particles is preferably crushed. This makes it possible to adjust the average particle size and the particle size distribution of the obtained cathode active material particles within a preferable range.

Note that crushing means an operation of applying mechanical energy to an aggregate formed of a plurality of secondary particles generated by, for example, sintering necking between the secondary particles when firing to separate the secondary particles from each other while hardly destroying the secondary particles themselves, thus loosening the aggregate.

A known means can be used for crushing, and for example, a pin mill or a hammer mill can be used. Note that at this time, a crushing force is preferably adjusted within an appropriate range so as not to destroy the secondary particles.

3. Lithium Ion Secondary Battery

The lithium ion secondary battery of the present invention includes similar components to a normal lithium ion secondary battery, such as a cathode, an anode, a separator, and an electrolyte. Note that in the following, a lithium ion secondary battery using, as an electrolyte, a non-aqueous electrolyte solution obtained by dissolving a lithium salt as a supporting salt in an organic solvent will be described. However, the secondary battery of the present invention can be widely applied to forms obtained by variously modifying or improving the embodiments described herein, and a lithium ion secondary battery (non-aqueous electrolyte secondary battery) including a solid electrolyte secondary battery using, as an electrolyte, a nonflammable and ionic conductive solid electrolyte such as an oxide-based solid electrolyte, for example, LLZO ($Li_7La_3Zr_2O_{12}$), LTTO ($Li_xLa_{(2-x)}/3TiO_3$ or LATP ($Li_{1+x}Al_xTi_{2-x}(PO_4)_3$), or a sulfide-based solid electrolyte, for example, $Li_2S$—$P_2S_5$.

(1) Components of Lithium Ion Secondary Battery a) Cathode

Using the above-described cathode active material, for example, a cathode of a lithium ion secondary battery is prepared as follows.

First, a conductive material and a binding agent are mixed with the cathode active material of the present invention. Furthermore, activated carbon and a solvent, for example, for adjusting viscosity are added as necessary. These are kneaded to prepare a cathode mixture paste. At this time, a mixing ratio among the components in the cathode mixture paste is also an important factor for determining performance of the non-aqueous electrolyte solution secondary battery. For example, when the solid content of the cathode mixture excluding the solvent is 100 mass parts, the content of the cathode active material can be 60 mass parts to 95 mass parts, the content of the conductive material can be 1 mass part to 20 mass parts, and the content of the binding agent can be 1 mass part to 20 mass parts as in a cathode of a normal non-aqueous electrolyte solution secondary battery.

The obtained cathode mixture paste is applied to a surface of a collector, for example, made of aluminum foil and dried to scatter the solvent. Pressurization may be performed by a roll press or the like in order to increase the electrode density as necessary. In this way, a sheet-shaped cathode can be prepared. The sheet-shaped cathode is cut into an appropriate size according to a target battery, for example, and used for preparing a battery. Note that the method for preparing a cathode is not limited to the exemplified ones, and other means may be used.

Examples of the conductive material include graphite (natural graphite, artificial graphite, expanded graphite, and the like) and a carbon black-based material such as acetylene black or Ketjen black.

The binding agent serves to hold the cathode active material particles together, and examples thereof include polyvinylidene fluoride (PVDF), polytetrafluoroethylene (PTFE), a fluorocarbon rubber, an ethylene propylene diene rubber, styrene butadiene, a cellulose-based resin, and polyacrylic acid.

In addition, a solvent that disperses the cathode active material, the conductive material, and activated carbon and dissolves the binding agent can be added to the cathode mixture as necessary. Specifically, as the solvent, an organic solvent such as N-methyl-2-pyrrolidone can be used. Activated carbon can be added to the cathode mixture in order to increase electric double layer capacity.

b) Anode

Metallic lithium, a lithium alloy, or the like can be used for the anode. In addition, a product formed by mixing a binding agent with an anode active material capable of occluding and desorbing lithium ions, adding an appropriate solvent thereto to form a paste-like anode mixture, applying the anode mixture to a surface of a collector made of metal foil such as copper, drying the anode mixture, and compressing the resulting product to increase the electrode density as necessary can be used.

Examples of the anode active material include a lithium-containing substance such as metallic lithium or a lithium alloy, natural graphite, artificial graphite, and a fried body of an organic compound such as a phenolic resin, capable of occluding and desorbing lithium ions, and a powdery carbon substance such as coke. In this case, as the anode binding agent, a fluorine-containing resin such as PVDF can be used, and as the solvent for dispersing the anode active material and the binding agent, an organic solvent such as N-methyl-2-pyrrolidone can be used as in the cathode.

c) Separator

The separator is sandwiched between the cathode and the anode, and has a function of separating the cathode from the anode and holding the electrolyte solution. As such a separator, for example, a polyethylene or polypropylene thin film having a large number of fine pores can be used. However, the separator is not particularly limited as long as having the above-described function.

d) Non-Aqueous Electrolyte Solution

In the present invention, the type of electrolyte of the lithium ion secondary battery is not limited. However, a non-aqueous electrolyte solution generally used as the non-aqueous electrolyte of the lithium ion secondary battery is a solution obtained by dissolving a lithium salt as a supporting salt in an organic solvent.

As the organic solvent, one selected from the group consisting of a cyclic carbonate such as ethylene carbonate, propylene carbonate, butylene carbonate, or trifluoropropylene carbonate; a chain carbonate such as diethyl carbonate, dimethyl carbonate, ethylmethyl carbonate, or dipropyl carbonate; an ether compound such as tetrahydrofuran, 2-methyltetrahydrofuran, or dimethoxy ethane; a sulfur compound such as ethylmethylsulfone or butanesulton; and a phosphorus compound such as triethyl phosphate or trioctyl phosphate can be used singly, or two or more selected therefrom can be used in mixture.

Examples of the supporting salt include $LiPF_6$, $LiBF_4$, $LiClO_4$, $LiAsF_6$, $LiN(CF_3SO_2)_2$, and a composite salt thereof. Note that the non-aqueous electrolyte solution may contain a radical scavenger, a surfactant, a flame retardant, or the like.

(2) Structure of Lithium Ion Secondary Battery

The lithium ion secondary battery including the above cathode, anode, separator, and electrolyte can be formed into various shapes such as a cylindrical shape and a laminated shape.

Regardless of which shape is adopted, when the cathode and the anode are laminated via the separator to form an electrode body and a non-aqueous electrolyte solution is used as the electrolyte in the obtained electrode body, the electrode body is impregnated with this non-aqueous electrolyte solution, a cathode collector is connected to a cathode terminal leading to the outside using a current collecting lead or the like, an anode collector is connected to an anode terminal leading to the outside using a current collecting lead or the like, and the resulting product is sealed in a battery case to complete a non-aqueous electrolyte solution secondary battery.

(3) Characteristics of Lithium Ion Secondary Battery

The lithium ion secondary battery as described above uses the cathode active material of the present invention as the cathode material, and therefore has excellent capacity characteristics, output characteristics, and cycle characteristics. Specifically, since the lanthanum compound particles do not cover the entire surfaces of the cathode active material particles, lithium ion conductivity of each cathode active material particles is not hindered. In addition, since the lanthanum compound particles having excellent electron conductivity are dispersed on surfaces of the cathode active material particles and/or inside the cathode active material particles, more specifically, in gaps and grain boundaries between the primary particles, cathode resistance is decreased, and deterioration of the cathode active material is sufficiently suppressed. Moreover, even in comparison with a conventional secondary battery using a cathode active material formed of lithium nickel-based oxide particles, the lanthanum compound particles are dispersed in the cathode active material particles, and therefore it can be said that thermal stability and safety are excellent.

Figure 6:
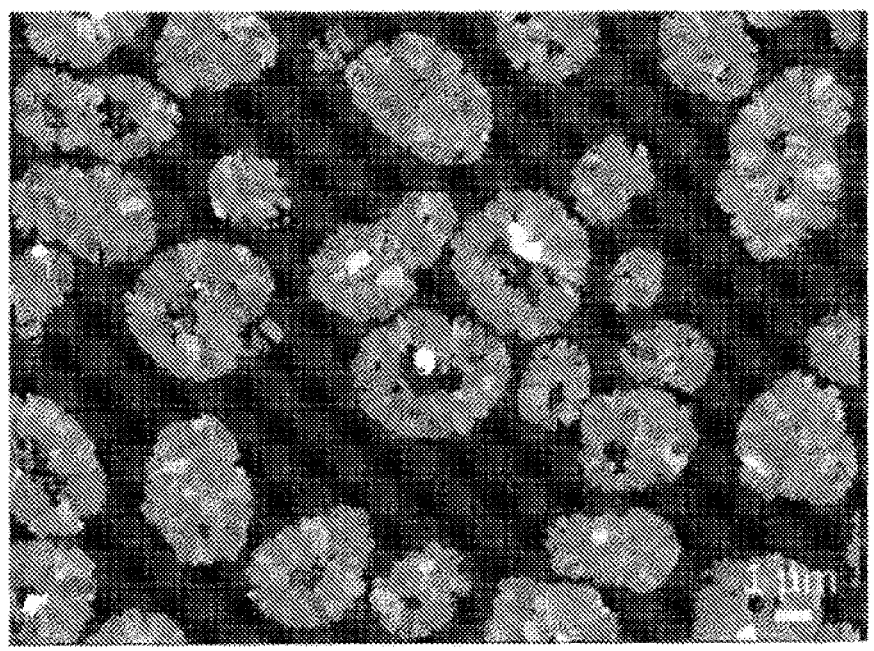
FIG. 6 is a secondary electron image of a cross section of the cathode active material obtained in Comparative Example 1.

For example, when a 2032 type coin-type battery as illustrated in FIG. 6 is formed using the cathode active material of the present invention, initial discharge capacity of 160 mAh/g or more and low cathode resistance can be achieved at the same time.

(4) Applications of Lithium Ion Secondary Battery

As described above, the lithium ion secondary battery using the cathode active material of the present invention as the cathode material has excellent capacity characteristics, output characteristics, and cycle characteristics, and can be preferably used as a power source for a small portable electronic device (a notebook personal computer, a mobile phone terminal, or the like) requiring all of these characteristics at a high level. The lithium ion secondary battery using the cathode active material of the present invention as the cathode material also has excellent safety, and not only can be miniaturized and can have a high output, but can also simplify an expensive protection circuit, and therefore can be preferably used as a power source for a transportation device limited in mounting space.

EXAMPLES

Hereinafter, the present invention will be described in more detail with reference to Examples and Comparative Examples.

Example 1

(A) Crystallization Process
[Nuclear Generation Process]

First, 14 L of water was put in a reaction tank, and the temperature in the tank was set to 40° C. while water was stirred. At this time, a nitrogen gas was circulated in the reaction tank for 30 minutes to set the reaction atmosphere to a non-oxidizing atmosphere having an oxygen concentration of 2% by volume or less. Subsequently, an appropriate amount of a 25% by mass sodium hydroxide aqueous solution and 25% by mass ammonia water were supplied into the reaction tank, and adjustment was performed such that a pH value on the basis of the liquid temperature of 25° C. was 12.6 and an ammonium ion concentration was 10 g/L, thus forming a pre-reaction aqueous solution.

At the same time, nickel sulfate, cobalt sulfate, and manganese sulfate were dissolved in water such that a molar ratio among the metal elements satisfied Ni:Mn:Co=38.0: 30.0:32.0 to prepare a 2 mol/L raw material aqueous solution for a nuclear generation process.

Next, this raw material aqueous solution was supplied to the pre-reaction aqueous solution at 115 ml/min to form an aqueous solution for the nuclear generation process, and nuclear generation was performed. At this time, a 25% by mass sodium hydroxide aqueous solution and 25% by mass ammonia water were supplied at an appropriate time to maintain the pH value and ammonium ion concentration of the aqueous solution for nuclear generation within the above ranges.

[Particle Growth Process]

After completion of nuclear generation, supply of all the aqueous solutions was temporarily stopped, and sulfuric acid was added to adjust the pH value on the basis of the liquid temperature of 25° C. to 11.2, thus forming an aqueous solution for particle growth. At the same time, nickel sulfate, cobalt sulfate, manganese sulfate, and lanthanum sulfate were dissolved in water such that a molar ratio among the metal elements satisfied Ni:Mn:Co: La=38.0:30.0:32.0:0.4 to prepare a 2 mol/L raw material aqueous solution for a nuclear growth process.

It was confirmed that the pH value had reached a predetermined value. Thereafter, the raw material aqueous solution was supplied to grow the nuclei (particles) generated in the nuclear generation process. Thereafter, the obtained product was washed with water, filtered, and dried to obtain powdered composite hydroxide particles.

Note that in the particle growth process, a 25% by mass sodium hydroxide aqueous solution and 25% by mass ammonia water were supplied at an appropriate time through the process to maintain the pH value and ammonium ion concentration of the aqueous solution for particle growth within the above ranges.

(B) Evaluation of Composite Hydroxide Particles
[Composition]

According to analysis using an ICP emission spectroscopic analyzer (ICPE-9000 manufactured by Shimadzu Corporation), the composite hydroxide particles were found to have a metal element molar ratio of Ni:Mn:Co:La=38.0: 30.0:32.0:0.4.

[Distribution of Lanthanum Element]

Some of the obtained composite hydroxide particles were embedded in a resin and subjected to cross section polisher processing such that cross sections thereof were observable. Thereafter, distribution of the lanthanum element in the composite hydroxide particles was analyzed by energy dispersive X-ray analysis (EDS) using a Schottky field emission type scanning electron microscope (SEM-EDS) (JSM-70001F manufactured by JEOL Ltd.). As a result, it was confirmed that there was no bias of the lanthanum element in the composite hydroxide particles and the lanthanum element was uniformly dispersed in the secondary particles.

(C) Calcination Process

The composite hydroxide particles obtained as described above were sufficiently mixed with lithium carbonate (melting point: 723° C.) using a shaker mixer device (TURBULA TypeT2C manufactured by Willy et Bacoffen (WAB)) such that a molar ratio of Li/(Ni+Co+Mn) was 1.10 to obtain a lithium mixture.

The temperature of this lithium mixture was raised to 630° C. in an air (oxygen concentration: 21% by volume) flow using an electric furnace (electric muffle furnace, special FUM373 manufactured by Toyo Seisakusho Co., Ltd.) at a temperature rising rate of about 2.1° C./min. The lithium mixture was held at this temperature for 4 hours to be fired, and cooled to room temperature at a cooling rate of about 4° C./min to obtain a calcination powder.

(D) Main Firing Process

The temperature of the calcination powder obtained in the calcination process was similarly raised to 920° C. in an air (oxygen concentration: 21% by volume) flow using the electric furnace at a temperature rising rate of about 3° C./min. The calcination powder was held at this temperature for 4 hours to be fired, and cooled to room temperature at a cooling rate of about 4° C./min to obtain a cathode active material containing lanthanum.

The cathode active material thus obtained was aggregated or slightly sintered. Therefore, this cathode active material was crushed using a continuous mill (MF10 Basic manufactured by IKA).

(E) Evaluation of Cathode Active Material

[Composition]

By analysis using an ICP emission spectroscopic analyzer, this cathode active material was found to be formed of composite oxide particles containing metal elements at a molar ratio of Li; Ni:Mn:Co:La=1.10:0.38:0.30:0.32:0.004. Note that the content of lanthanum with respect to the entire cathode active material was 0.55% by mass.

[Location of Lanthanum Compound]

The location of the lanthanum compound was confirmed by observing a secondary electron image and a backscattered electron image of a surface and a cross section of the cathode active material using SEM-EDS. From the backscattered electron image of surfaces of the cathode active material particles, it was confirmed that fine particles represented by white contrast were dispersed on the surface of the cathode active material. From this, it was confirmed that these fine particles were a lanthanum-containing compound (lanthanum compound particles). In addition, from the secondary electron image of the cross sections of the cathode active material particles, obtained by embedding a part of the cathode active material in a resin and subjecting the part to cross section polisher processing, it was confirmed that lanthanum compound particles were also present in gaps between primary particles inside the cathode active material.

[Crystal Structure]

The crystal structure of the cathode active material was analyzed using an X-ray diffraction analyzer (X'Pert PRO manufactured by PANalytical). As a result, a diffraction pattern was confirmed in which a peak derived from a lithium composite oxide of $Li_{1.10}Ni_{0.38}Co_{0.32}Mn_{0.30}O_2$ having a layered rock salt type structure and a peak of a perovskite-type structure were combined. From this, it was confirmed that the lanthanum compound was a compound having a perovskite-type structure.

[Dispersibility of Lanthanum Compound Particles]

Dispersibility of the lanthanum compound particles was analyzed using image analysis software IMAGE J (open source). From the backscattered electron image of surfaces of the cathode active material particles, the number of lanthanum compound particles generated on the surfaces of the cathode active material particles was measured, and the number of lanthanum compound particles generated per area of the cathode active material was calculated. In addition, by measuring the number of lanthanum compound particles generated on the cross sections of the cathode active material particles and the cross sectional area of the cathode active material particles from the SEM image of the cross section of the cathode active material, and dividing the number of lanthanum compound particles by the cross sectional area, the number of lanthanum compound particles per unit area of the cross section of the cathode active material was calculated.

[Size of Lanthanum Compound Particle]

The size of the lanthanum compound particle was analyzed using image analysis software IMAGE J (open source). By analyzing the shapes of the lanthanum compound particles from the SEM image of the cross section, calculating a maximum ferret diameter of each of the lanthanum compound particles (a distance of the longest straight line connecting any two points on an outer boundary of each of the lanthanum compound particles), and calculating a number average thereof, a cross-sectional average particle size of the lanthanum compound particles was calculated. In addition, by calculating a maximum ferret diameter of each of the lanthanum compound particle from the backscattered electron image of a surface of the cathode active material in a similar manner, and calculating a number average thereof, the surface average particle size of the lanthanum compound particles was calculated.

[Volume Resistivity of Cathode Active Material During Powder Compaction]

The volume resistivity of the cathode active material during powder compaction was measured using a powder resistance measurement system (MCP-PD51 manufactured by Mitsubishi Chemical Analytech Co., Ltd.) and a resistance meter (Loresta-GP manufactured by Mitsubishi Chemical Analytech Co., Ltd.). Using the cathode active material as a powder sample, 5 g of the cathode active material was put in a holder having an inner diameter of 10 mm, and the volume resistivity (Q-cm) of the powder was measured when a load of 20 kN (63.7 MPa) was applied. The measurement was performed three times, and an arithmetic mean of the three values was adopted as a measurement result.

(F) Manufacture of Cathode

The cathode active material, a conductive material (acetylene black), a binding material (PVdF), and a solvent (NMP) were mixed using a planetary mixer to prepare a paste containing the cathode active material. The solid content ratio of the paste was 50% by mass. The composition of the solid content was "cathode active material:conductive material:binding material=84:12:4" in terms of mass ratio. The paste was applied to surfaces (both front and back sides) of a collector (Al foil) using a die coater and dried. As a result, a cathode active material layer was formed. The cathode active material layer was compressed using a roll rolling mill. The cathode active material layer and the collector were cut into strips using a slitter. As described above, a cathode was manufactured.

(G) Discharge Capacity of Cathode Active Material

Figure 7:
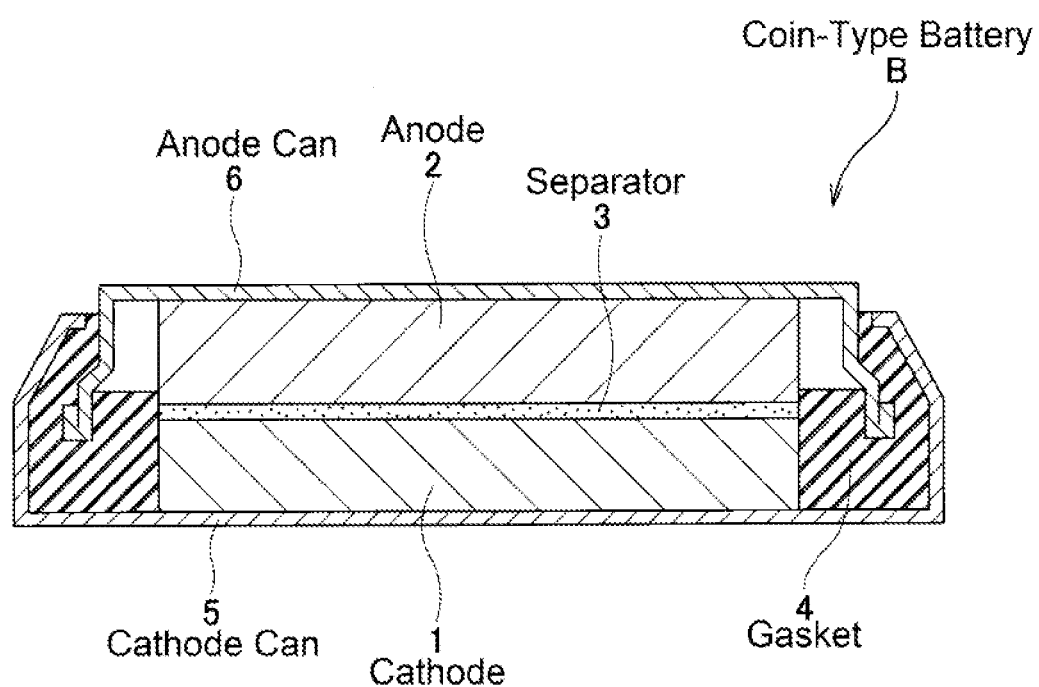
FIG. 7 is a schematic cross-sectional view of a 2032 type coin-type battery used for battery evaluation.

A 2032 type coin-type battery (B) illustrated in FIG. 7 was prepared as follows. First, 52.5 mg of the cathode active material, 15 mg of acetylene black, and 7.5 mg of PTFE were mixed, press-molded to a diameter of 11 mm and a thickness of 100 µm at a pressure of 100 MPa, and then dried in a vacuum dryer at 120° C. for 12 hours to prepare a cathode (1).

Next, using this cathode (1), the 2032 type coin-type battery (B) was prepared in a glove box having an Ar atmosphere with a dew point controlled at −80° C. For an anode (2) of this 2032 type coin-type battery (B), a lithium metal having a diameter of 17 mm and a thickness of 1 mm was used. For an electrolyte solution, an equivalent mixed solution of ethylene carbonate (EC) and diethyl carbonate (DEC) using 1 M $LiClO_4$ as a supporting electrolyte (manufactured by Tomiyama Pure Chemical Industries, Ltd.) was used. For a separator (3), a polyethylene porous film having a film thickness of 25 µm was used. Note that the 2032 type coin-type battery (B) included a gasket (4) and was assembled into a coin-shaped battery with a cathode can (5) and an anode can (6).

The 2032 type coin-type battery (B) was left for about 24 hours after being prepared. After an open circuit voltage (OCV) was stabilized, a charge and discharge test was performed in which a current density with respect to the cathode was set to 0.1 mA/cm², charge was performed until a cutoff voltage reached 4.3 V, after a 1-hour rest period, discharge was performed until the cutoff voltage reached 3.0 V, and a discharge capacity at this time was measured, and an initial discharge capacity was determined. As a result, it was confirmed that the initial discharge capacity was 167 mAh/g.

Note that a multi-channel voltage/current generator (R6741A manufactured by Advantest Co., Ltd.) was used to measure the initial discharge capacity.

Comparative Example 2

A cathode active material was prepared and evaluated in a similar manner to Example 1 except that lanthanum sulfate was not added to the raw material aqueous solution in the nuclear growth process and only the main firing process was performed without performing the calcination process.

TABLE 1

| | Calcination temperature [° C.] | Main firing temperature [° C.] | Content of lanthanum [% by weight] | Number of La compound particles present per unit area of cross sections of secondary particles [particles/μm$^2$] | Number of La compound particles present on surfaces of secondary particles/Area of active material [particles/μm$^2$] | Cross-sectional average particle size [μm] | Surface average particle size [μm] | Initial discharge capacity [mAh/g] | Volume resistivity during powder compaction [10$^3$ Ωcm] |
|---|---|---|---|---|---|---|---|---|---|
| Example 1 | 630 | 920 | 0.5 | 0.042 | 0.015 | 0.51 | 0.46 | 167 | 1.79 |
| Example 2 | 660 | 920 | 0.5 | 0.093 | 0.054 | 0.31 | 0.16 | 168 | 1.68 |
| Example 3 | 690 | 920 | 0.5 | 0.058 | 0.214 | 0.40 | 0.25 | 166 | 1.82 |
| Example 4 | 720 | 920 | 0.5 | 0.091 | 0.130 | 0.45 | 0.31 | 169 | 1.66 |
| Comparative Example 1 | — | 920 | 0.5 | 0.038 | 0.007 | 0.74 | 0.54 | 165 | 1.85 |
| Comparative Example 2 | — | 920 | 0 | — | — | — | — | 166 | 1.88 |

Table 1 illustrates firing conditions of Example 1 and evaluation results of the cathode active material obtained in Example 1. The same applies to the following Examples 2 to 4 and Comparative Examples 1 and 2.

Example 2

A cathode active material was prepared and evaluated in a similar manner to Example 1 except that the holding temperature in the calcination process was 660° C.

Example 3

Figure 3:
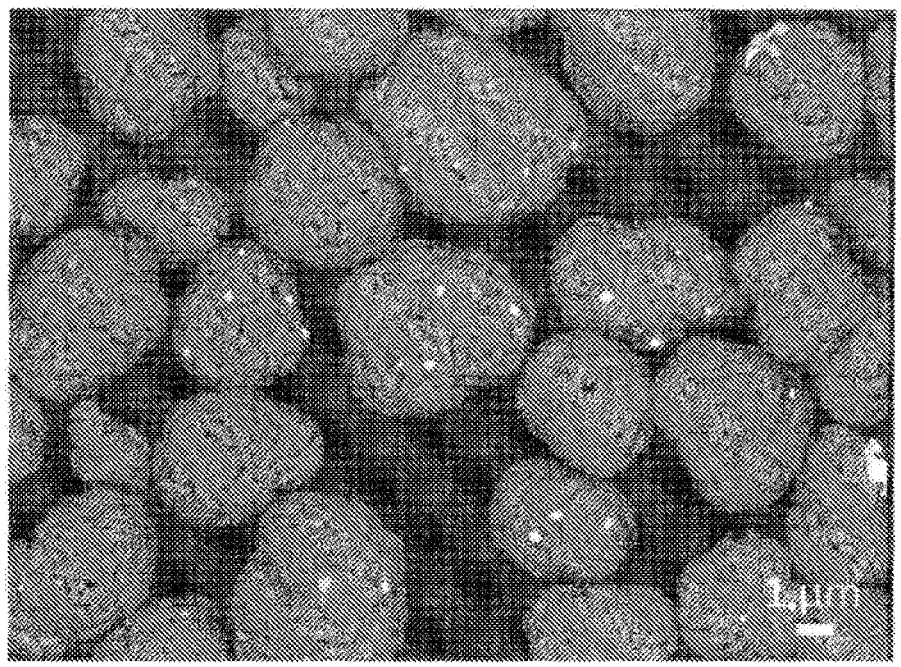
FIG. 3 is a backscattered electron image of a surface of a cathode active material obtained in Example 3.
Figure 4:
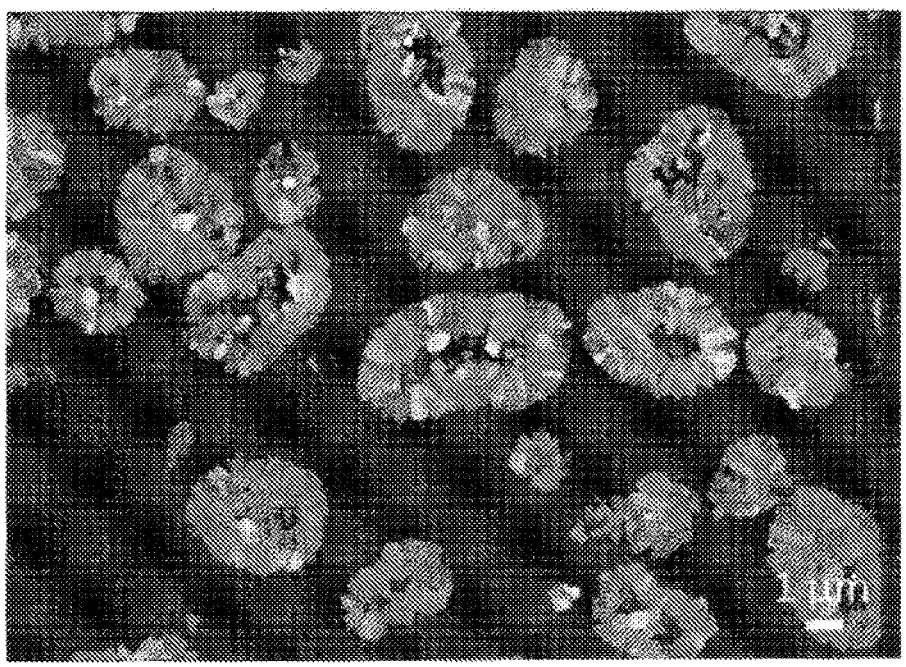
FIG. 4 is a secondary electron image of a cross section of the cathode active material obtained in Example 3.

A cathode active material was prepared and evaluated in a similar manner to Example 1 except that the holding temperature in the calcination process was 690° C. FIG. 3 and FIG. 4 illustrate a backscattered electron image of a surface of the cathode active material obtained in Example 3 and a secondary electron image of a cross section thereof, respectively.

Example 4

A cathode active material was prepared and evaluated in a similar manner to Example 1 except that the holding temperature in the calcination process was 720° C.

Comparative Example 1

Figure 5:
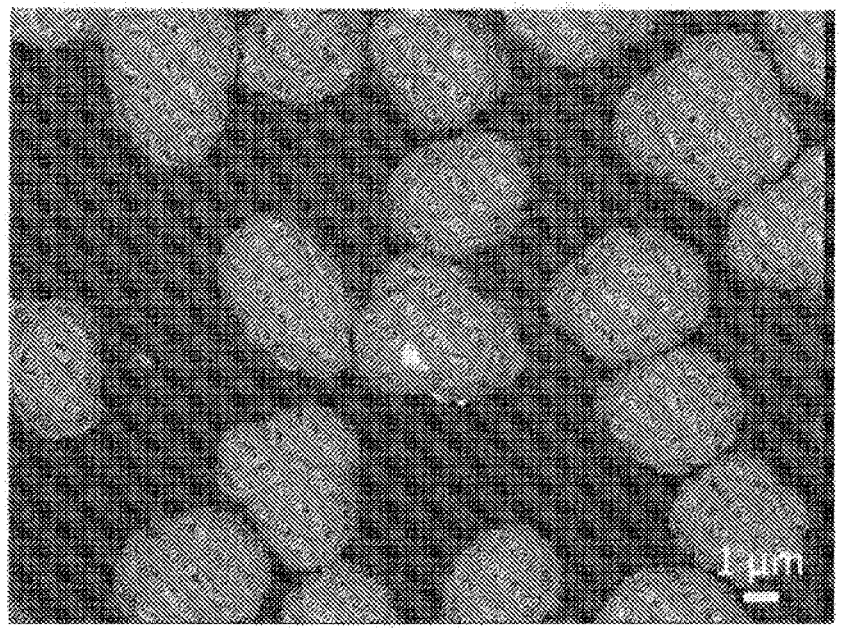
FIG. 5 is a backscattered electron image of a surface of a cathode active material obtained in Comparative Example 1.

A cathode active material was prepared and evaluated in a similar manner to Example 1 except that only the main firing process was performed without performing the calcination process. FIG. 5 and FIG. 6 illustrate a backscattered electron image of a surface of the cathode active material obtained in Comparative Example 1 and a secondary electron image of a cross section thereof, respectively.

Table 1 illustrates results of Examples 1 to 4 and Comparative Examples 1 and 2. All of the cathode active materials of Examples 1 to 4 had the cross-sectional average particle size and the surface average particle size of the lanthanum compound particles in preferable ranges, the initial discharge capacities larger than that of Comparative Example 1, and the volume resistivity lower than that of Comparative Example 1 during powder compaction. Therefore, it was confirmed that a lithium ion secondary battery having excellent characteristics could be obtained by using these cathode active materials. Meanwhile, in Comparative Example 1, in particular, the volume resistivity during powder compaction was not satisfactory. It is considered that this was affected by deterioration of the electron conductivity of the cathode active material because of the too large cross-sectional average particle size and surface average particle size of the lanthanum compound particles. In Comparative Example 2, in particular, the volume resistivity during powder compaction was high. This is considered to be because the electron conductivity of the cathode active material could not be improved because of absence of the lanthanum compound particles.

REFERENCE SIGNS LIST

1 Cathode (electrode for evaluation)
2 Anode
3 Separator
4 Gasket
5 Cathode can
6 Anode can
B 2032 Type coin-type battery

The invention claimed is:

1. A method for manufacturing a cathode active material for a lithium ion secondary battery, the method comprising:
   a mixing process of mixing transition metal-containing composite compound particles containing lanthanum with a lithium compound to obtain a lithium mixture;
   a calcination process of firing the lithium mixture at a temperature equal to or lower than a melting point of the lithium compound; and
   a main firing process of firing the lithium mixture at a temperature higher than the melting point of the lithium compound after the calcination process, wherein
   the method brings about a cathode active material for a lithium ion secondary battery, the cathode active material including a lithium transition metal-containing oxide constituted by secondary particles each formed of a plurality of primary particles, in which lanthanum compound particles each having a perovskite-type structure are dispersed on surfaces of the secondary particles and/or in gaps or grain boundaries between the primary particles, and the lanthanum compound particles have a cross-sectional average particle size of 0.70 µm or less.

2. The method for manufacturing a cathode active material for a lithium ion secondary battery according to claim 1, wherein lithium carbonate is used as the lithium compound.

3. The method for manufacturing a cathode active material for a lithium ion secondary battery according to claim 2, wherein the firing temperature in the calcination process is within a range of 600° C. to 723° C.

4. The method for manufacturing a cathode active material for a lithium ion secondary battery according to claim 1, wherein the firing temperature in the main firing process is within a range of 725° C. to 1000° C.

5. The method for manufacturing a cathode active material for a lithium ion secondary battery according to claim 1, wherein the transition metal-containing composite compound particles containing lanthanum are obtained by a coprecipitation method.

6. The method for manufacturing a cathode active material for a lithium ion secondary battery according to claim 5, wherein
   a coprecipitation process for obtaining the transition metal-containing composite compound particles containing lanthanum by the coprecipitation method includes:
   a nuclear generation process of performing nuclear generation by controlling an aqueous solution for nuclear generation containing a first transition element compound containing at least one first transition element selected from the group consisting of nickel, manganese, and cobalt and an ammonium ion supplier such that a pH value on a basis of the liquid temperature of 25° C. is 12.0 to 14.0; and
   a particle growth process of growing the nuclei by controlling an aqueous solution for particle growth containing nuclei obtained in the nuclear generation process such that a pH value on a basis of the liquid temperature of 25° C. is lower than the pH value in the nuclear generation process and is 10.5 to 12.0, and supplying the first transition element compound and a lanthanum-containing compound.

7. The method for manufacturing a cathode active material for a lithium ion secondary battery according to claim 1, wherein a content of lanthanum in the transition metal-containing composite compound particles containing lanthanum is an amount corresponding to a range of 0.1% by mass to 5% by mass with respect to the entire cathode active material for a lithium ion secondary battery.

* * * * *